(12) United States Patent
Van De Sluis et al.

(10) Patent No.: US 8,887,199 B2
(45) Date of Patent: Nov. 11, 2014

(54) SYSTEM, APPARATUS, AND METHOD FOR TEMPLATES OFFERING DEFAULT SETTINGS FOR TYPICAL VIRTUAL CHANNELS

(75) Inventors: Bartel Marinius Van De Sluis, Eindhoven (NL); Adolf Proidl, Vessem (NL); Lukasz Marek Szostek, Eindhoven (NL); Mark Henricus Verberkt, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1562 days.

(21) Appl. No.: 12/097,933

(22) PCT Filed: Dec. 14, 2006

(86) PCT No.: PCT/IB2006/054872
§ 371 (c)(1),
(2), (4) Date: Oct. 21, 2008

(87) PCT Pub. No.: WO2007/072368
PCT Pub. Date: Jun. 28, 2007

(65) Prior Publication Data
US 2009/0228926 A1 Sep. 10, 2009

Related U.S. Application Data

(60) Provisional application No. 60/751,508, filed on Dec. 19, 2005.

(51) Int. Cl.
*H04N 5/445* (2011.01)
*H04N 7/16* (2011.01)
*H04N 21/45* (2011.01)
*H04N 21/458* (2011.01)
*H04N 21/485* (2011.01)
*H04N 21/475* (2011.01)

(52) U.S. Cl.
CPC ............ *H04N 5/44543* (2013.01); *H04N 7/163* (2013.01); *H04N 21/4532* (2013.01); *H04N 21/458* (2013.01); *H04N 21/4858* (2013.01); *H04N 21/4755* (2013.01)
USPC ........................................................... 725/39

(58) Field of Classification Search
None
See application file for complete search history.

(56) References Cited

U.S. PATENT DOCUMENTS

| 5,479,268 | A | * | 12/1995 | Young et al. | 386/291 |
| 5,550,575 | A | * | 8/1996 | West et al. | 725/28 |
| 6,163,316 | A | | 12/2000 | Killian | |
| 6,321,382 | B1 | * | 11/2001 | Wugofski | 725/59 |
| 6,438,752 | B1 | * | 8/2002 | McClard | 725/46 |

(Continued)

OTHER PUBLICATIONS

"Tivo Viewer's Guide" 2002 Tivo Inc. XP002366656.

*Primary Examiner* — Annan Shang (57) ABSTRACT

The system, apparatus and method, of the present application offers the viewer a set of typical virtual channel types based on some predefined or definable category, e.g., news channel, which includes predefined default settings and behavior. These typical virtual channel 'templates' make it very easy for a viewer to specify a virtual channel. For example, for a news channel, the default behavior is to only keep the most current coverage, for a series, the default behavior is to keep all until watched. Such a typical virtual channel can be selected explicitly or implicitly. In addition, a virtual channel wizard is provided by the system, apparatus, and method of the present invention that interactively guides a viewer through setting up own templates.

23 Claims, 7 Drawing Sheets

(56) References Cited

U.S. PATENT DOCUMENTS

| | | | |
|---|---|---|---|
| 6,601,237 B1 | 7/2003 | Ten Kate | |
| 6,990,480 B1 * | 1/2006 | Burt | 1/1 |
| 7,543,322 B1 * | 6/2009 | Bhogal et al. | 725/46 |
| 7,809,942 B2 * | 10/2010 | Baran et al. | 713/160 |
| 7,813,822 B1 * | 10/2010 | Hoffberg | 700/94 |
| 8,495,680 B2 * | 7/2013 | Bentolila et al. | 725/46 |
| 2001/0043795 A1 * | 11/2001 | Wood et al. | 386/69 |
| 2002/0009283 A1 | 1/2002 | Ichioka | |
| 2002/0128933 A1 * | 9/2002 | Day et al. | 705/27 |
| 2003/0041327 A1 | 2/2003 | Newton | |
| 2003/0101449 A1 | 5/2003 | Bentolila | |
| 2003/0126600 A1 * | 7/2003 | Heuvelman | 725/35 |
| 2003/0233655 A1 * | 12/2003 | Gutta et al. | 725/46 |
| 2005/0014987 A1 * | 1/2005 | Basset et al. | 585/708 |
| 2005/0160458 A1 | 7/2005 | Baumgartner | |
| 2005/0273833 A1 * | 12/2005 | Soinio | 725/113 |
| 2007/0118852 A1 * | 5/2007 | Calderwood | 725/38 |

* cited by examiner

| | SERIES 101 | NEWS 101 | KIDS (BASIC) 101 | KIDS (ADVANCED) 101 |
|---|---|---|---|---|
| PREFERRED CONTENT 102 | - SELECT PROGRAM NAME | - SELECT PREFERRED MAIN NEWS PROGRAM<br>- SELECT PREFERRED NEWS BACKGROUND PROGRAMS | - SELECT PREFERRED PROGRAMS | - INDICATE SOME EXAMPLE PROGRAMS |
| SPECIFIC REQUIREMENTS 102 | - TIME/CHANNEL | | - PREFERRED LANGUAGE<br>- PREFERRED CHANNELS | - PREFERRED LANGUAGE<br>- PREFERRED CHANNELS<br>- VIOLENCE LEVEL<br>- AGE (LATTER TWO DEPEND ON PROGRAM METADATA) |
| VIRTUAL CHANNEL NAME 102 | - PROGRAM NAME AS SUGGESTION | | - COULD BE SUGGESTED BY DERIVING IT FROM GENRE INFO OF SELECTED PROGRAM SET<br>- NAME OF KID(S) | - COULD BE SUGGESTED BY DERIVING IT FROM GENRE INFO OF SELECTED PROGRAM SET<br>- NAME OF KID(S) |
| PRESET POSITION 102 | | | | |
| RESUMPTION STRATEGY 102 | - RESUME WHERE LEFT OFF<br>- OFFER OPTION TO PLAY SUMMARY OF PREVIOUS PART WHEN LONG TIME NO SEE | - RESUME WHERE LEFT OFF ONLY IF USER LEFT MAIN NEWS PROGRAM WITHIN 1 OR 2 HOURS<br>- ALWAYS START AT BEGINNING OF LATEST MAIN NEWS PROGRAM | - RESUME WHERE LEFT OFF (IF RESUMPTION WITHIN HOUR/DAY?)<br>- START AT THE BEGINNING OF A PROGRAM? | - RESUME WHERE LEFT OFF (IF RESUMPTION WITHIN HOUR/DAY?)<br>- START AT THE BEGINNING OF A PROGRAM? |
| PROGRAM SEQUENCING 102 | | - START WITH MAIN NEWS PROGRAM<br>- FOLLOWED BY NEWS BACKGROUND PROGRAMS<br>- DEPENDENT ON AMOUNT OF BACKGROUND PROGRAMS DEFINED, MAIN NEWS IN REPEATED AFTER 2-3 HOURS (?) | - START WITH SHORT PROGRAMS? | |
| INTERACTION MODES 102 | - JUMP THROUGH EPISODES<br>- NAVIGATE WITHIN PROGRAM<br>- WATCH EPISODE SUMMARIES | | - OFFER TO REPEAT A PROGRAM<br>- ENABLE KIDS TO MARK NICE PROGRAMS (DURING PLAYBACK?) FOR REPEAT LATER ON | - OFFER TO REPEAT A PROGRAM<br>- ENABLE KIDS TO MARK NICE PROGRAMS (DURING PLAYBACK?) FOR REPEAT LATER ON |
| DELETION STRATEGY 102 | - DELETE AFTER WATCHING/PLAYING<br>- KEEP MAX(X) LAST EPISODES<br>- PROVIDE OPTION TO KEEP SUMMARIES OF DELETED EPISODES THAT HAVE NOT BEEN WATCHED | | - DELETE AFTER WATCHING/PLAYING (UNLESS MARKED AS NICE) | - DELETE AFTER WATCHING/PLAYING (UNLESS MARKED AS NICE) |

FIG. 1

| | GENRE 201 | PERSONAL CHANNEL 201 | MUSIC CHANNEL 201 | KEYWORD TOPIC CHANNEL 201 |
|---|---|---|---|---|
| PREFERRED CONTENT 202 | - SELECT GENRE (E.G. SERIES, EROTIC, DOCUMENTARY, SPORTS, COMEDY ETC) | | - SELECT PREFERRED MUSIC PROGRAMS<br>- SELECT ARTISTS, MUSIC GENRE'S, MUSIC CHANNELS<br>- OR USE MUSIC PLAYBACK HISTORY AS BASIS (MULTI-USER PROBLEM) | - ENTER KEYWORDS (E.G. 'CLINT EASTWOOD' 'FORMULA 1' ETC)<br>- SYSTEM SHOULD MAKE SURE THAT THE SPELLING IS CORRECT |
| SPECIFIC REQUIREMENTS 202 | - SELECT PREFERRED PROGRAMS WITHIN THE SELECTED GENRE | -?? | - INDICATE WHETHER YOU WANT MUSIC CLIPS ONLY OR ALSO MUSIC NEWS | - PREFERRED LANGUAGE<br>- PREFERRED CHANNELS<br>- INDICATE RELEVANT GENRE(S) |
| VIRTUAL CHANNEL NAME SHOULD BE UNIQUE WITHIN ZAP CIRCLE 202 | - GENRE NAME AS SUGGESTION (E.G. 'DOCUMENTARY CHANNEL') | - PERSON NAME AS SUGGESTION (E.G. JIM'S CHANNEL) | - 'MUSIC CHANNEL' AS SUGGESTED NAME | - KEYWORD/TOPIC NAME AS SUGGESTED NAME |
| PRESET POSITION 202 | | | | |
| RESUMPTION STRATEGY 202 | - RESUME WHERE LEFT OFF (CAN ALSO DEPEND ON SELECTED GENRE) | - DEPENDENT ON TIME, AND KNOWLEDGE ON USER HABITS | - RESUME WHERE LEFT OFF (IF RESUMPTION WITHIN MINUTES) OTHERWISE START AT THE BEGINNING OF A MUSIC CLIP | - LET USER INDICATE PREFERRED RESUMPTION STRATEGY |
| PROGRAM SEQUENCING 202 | - DEPENDANT ON GENRE:<br>SERIES: MIX VARIOUS SERIES<br>OTHER: START WITH PROGRAMS WHICH MATCH BEST WITH USER PROFILE | - DEPENDANT ON TIME, AND KNOWLEDGE ON USER HABITS | - BASED ON MUSIC PLAYLIST GENERATION MECHANISMS | - START WITH PROGRAMS THAT BEST MATCH WITH THE KEYWORD(S) |
| INTERACTION POSSIBILITY 202 | - JUMP THROUGH VARIOUS PROGRAMS<br>- NAVIGATE WITHIN PROGRAM | - ENABLE USER TO SEE (AND POSSIBLY EDIT) HIS 'MENU FOR TODAY/TONIGHT' | - OFFER POSSIBILITY TO REPEAT A PROGRAM<br>- ENABLE KIDS TO MARK NICE PROGRAMS (DURING PLAYBACK?), REPEAT THOSE LATER ON. | - ENABLE THE USER TO SEE LIST OF RECORDED 'HITS' (ALSO UPCOMING 'HITS'?) |
| DELETION STRATEGY 202 | - DELETE AFTER WATCHING (=PLAYING)<br>- PROVIDE OPTION TO KEEP PROGRAMS | - DELETE AFTER WATCHING (=PLAYING)<br>- PROVIDE OPTION TO KEEP PROGRAMS | - KEEP MUSIC CLIPS UNLESS USER INDICATES DISLIKES<br>- DELETE MUSIC NEWS AFTER WATCHING/PLAYING | - DELETE AFTER WATCHING/PLAYING (UNLESS MARKED AS KEEP) |

SYSTEM, APPARATUS, AND METHOD FOR TEMPLATES OFFERING DEFAULT SETTINGS FOR TYPICAL VIRTUAL CHANNELS

The system, apparatus, and method of the present invention provide templates and a template-based wizard, for the creation of virtual channels to be used by a personal video recorder (PVR), that include predefined default settings and behavior for different types of virtual channels, e.g., news, children's programs or TV series.

Virtual channels can be created for use by personal video recorders (PVR) from recorded television content, possibly mixed with live broadcast television content. Examples of virtual channels are: Sports Channel, News Channel, Kids Channel, Investment Channel, Jim's Channel (a personal channel, e.g. based on a personal profile), etc.

Virtual channels are a new paradigm to access recordings in products like PVRs and entertainment hubs. A virtual channel is an ordered playlist of (partial) television programs, which is mapped to a particular preset, i.e., an identified button on a PVR. The virtual channels concept allows users to create their own channels, access them via the well known channel paradigm and navigate within the channels as the users would within normal recordings, like for instance on a DVD. Virtual channels eliminate the need for day-to-day PVR management, due to the fact that programs are recorded, put in a playlist and deleted automatically, in accordance with user specifications provided in advance, or by a PVR manufacturer or a program service provider.

However, the user definition of virtual channels is no easy task, except for the simplest specification of a sequence of programs. Given the large number of programs available to select from, the user can easily become overwhelmed and not use the virtual channels feature or not use this feature fully. Therefore, a means for easy definition of virtual channels is needed.

The use of virtual channels of a PVR is facilitated by the template features provided by a system, apparatus, and method of the present invention. The virtual channel concept is based on the idea that a system automatically records, manages and deletes television content for a particular type of and named virtual channel, which can be seen as a playlist of television programs that is mapped to a particular channel preset (labeled button). Users are able to create their own virtual television channels, each having a content according to their own interests and habits. As a result, the need for regular channel surfing is minimized and furthermore recorded content becomes instantly available by virtual channel to the user without the user having to navigate through a menu of pre-recorded programs.

The templates of a preferred embodiment, greatly enhance the usability of virtual channels since, apart from defining the exact required content for a particular virtual channel, the user also needs to indicate the virtual channel name, preset position (the labeled button to be associated with the virtual channel), resumption strategy (default behavior when the user re-accesses the virtual channel), program sequencing (order of viewing content of the virtual channel) and deletion strategy (when a recording can be deleted from a virtual channel).

It is important to note that research has indicated that all these settings differ depending on the type of virtual channel being created. For instance, for a news channel the latest (recorded or ongoing) news program is most relevant, and news programs of two days ago usually have become obsolete. A series channel, however, preferably continues where the user left off last time he/she watched the series channel and with the already watched episodes being deleted soon thereafter. For a series channel the user can indicate a maximum number of recorded episodes for retention to prevent the storage device from becoming flooded with the series' episodes.

An advantage of the virtual templates approach is that it allows a user to quickly and easily set up new virtual channels. A virtual channel is selected explicitly when the user selects the type of channel to be created, or implicitly, where the system, apparatus and method of the present invention obtains the type of channel being created from an analysis of the user's first few inputs. While virtual templates provide default settings for associated parameters thereof, the user is able to change default settings at any time, while expending less effort to do so due to the existence of the templates in the first place.

In an alternative embodiment, the system, apparatus, and method of the present invention are implemented as a wizard that guides the user through the virtual definition/modification process step by step with dialogue. In a further alternative embodiment, the system, apparatus, and method also include provision for advanced users to alter all settings, i.e., define custom templates for their own use and even share customized templates with other users.

FIG. 1 illustrates template attributes and default settings for series, news, and kid's virtual channels;

FIG. 2 illustrates template attributes and default settings for genre, personal, music, and keyword/topic channels;

It is to be understood by persons of ordinary skill in the art that the following descriptions are provided for purposes of illustration and not for limitation. An artisan understands that there are many variations that lie within the spirit of the invention and the scope of the appended claims. Unnecessary detail of known functions and structure may be omitted from the current descriptions so as not to obscure the present invention. This is especially true of implementation details, even though some such implementation details are included in the drawings for an object implementation, where it is assumed that one skilled in the art of object oriented technology is thoroughly familiar with the architectural components and terminology used. However, objects are not the only implementation paradigm for the present invention and are herein used for expository purposes only.

The present invention is based on the idea that users will be able to create their own television channels (virtual channels), according to their own interests and habits using pre-defined templates. As a result, the need for surfing through regular channels is minimized and furthermore recorded content becomes instantly available to the user by virtual channel without having to navigate through a menu of recorded programs.

In a preferred embodiment, a user is offered a set of typical types of virtual channels which each include predefined default settings and behavior, see FIGS. 1-2. These typical virtual channels are actually presented as 'templates' that make it very easy for a user to specify a virtual channel. The actual format of the template presented to the user can be the table shown in FIGS. 1-2 for only one type of virtual channel, which type the user selects from a drop-down list of virtual channel types, such as:
Series
News
Basic kids
Advanced kids
Genre
Personal
Music
Keyword/topic The user fills in the template, makes selections from drop-down lists included in the template, accepts and replaces default settings, and makes corrections thereto. In an alternative embodiment, more than one of a given type virtual channel can be defined and either the system generates a unique name for these channels of the same type or the user specifies a unique name or both options are available to the user.

Such a typical virtual channel can be selected explicitly or implicitly:
  explicitly: user selects the type of virtual channel he wants to create (news, series, genre, keyword, kids, etc) from a drop-down list;
  implicitly: a type of virtual channel is derived by the system, apparatus, and method of the present invention from the user's first entries in the virtual channel definition process (e.g. selected preferred programs, selected genre, etc.) with the opportunity for the user to correct this choice, just in case it's not what the user intended.

For instance, in the explicit case, the user indicates that he/she wants to define a 'series' virtual channel. In the implicit case, the user could select a program (e.g., a daytime soap opera) and the system automatically associates the program's metadata with the virtual channel being defined. Thus, there is also provided by the system, apparatus, and method of the present invention a database including not only the predefined templates populated with drop-down lists and default values but also metadata for various types of programs, in this example for 'series' TV programs known as soap operas.

Default attributes are automatically associated with the series virtual channel template in a preferred embodiment. As a result, the user is only asked to fill-in what number of episodes he/she would like to retain in a persistent memory and onto which preset position (virtual channel button) the virtual channel series for the daytime soap opera should be mapped. The resumption strategy (continue where left off last time) and program sequencing (ordered episodes) are default settings or attributes in the series channel template so that a user does not have to enter those settings, however, the user is able to change any default setting either during the initial virtual channel definition process or subsequently during a modification procedure.

That is, the user is able to change the default settings and behavior of an already defined virtual channel at any time. The main advantage of the defaults is that users do not have to invent the optimal settings for a particular type of virtual channel themselves and are not required to input settings that are not germane to their usage habits.

An alternative preferred embodiment is implemented as a 'wizard' which is essentially a dialogue to guide the user through the virtual channel creation process by asking the user to enter the most relevant settings. An option is provided for the user to go to 'advanced mode' and be able to adjust all settings.

In another alternative embodiment, dependent on the chosen typical virtual channel, the ordering of the questions (settings) presented by the wizard to the user is changed dynamically in such a way that the most relevant questions (settings) for the specific virtual channel are presented first followed by the less relevant ones. In such a case, there is also an indication to the user of which questions/settings are required to be filled in, and which are optional. Optional settings always contain a default setting for the chosen virtual channel.

An explicit version of the template concept (user explicitly selects type of virtual channel at beginning of definition process) is preferably implemented in two ways:
  a dynamic menu: showing all relevant fields that the user has to fill in on the screen, which is presented to the user after the type of virtual channel has been selected by the user; and
  a 'wizard' as an on-screen dialogue which guides the user through the virtual channel creation process, starting with the question what type of virtual channel the user wants to create, followed by steps in which the user is asked to enter the relevant settings.

In both cases the user has the option to go to an 'advanced mode' and be able to adjust the other settings (e.g., to change the default settings of the virtual channel template).

The examples of virtual channels and their corresponding behaviors and settings given in FIGS. 1-2 are discussed below:

The following parameters are important for defining a virtual channel and its behavior and appear as row headings in FIGS. 1-2:
  Preferred content: selected (example) program(s), keyword(s), topic, (sub)genre.
  Specific requirements: preferred timeslot and channel, language, violence level.
  Virtual channel name: unique textual label for the channel.
  Preset position: channel number or button on which a virtual channel should be mapped.
  Resumption strategy: default behavior (content, position) when re-entering the channel.
  Program sequencing: the way in which the content should be ordered for playback.
  Interaction options: navigation, next/previous, mark as 'keep'/'repeat'/'delete', watch VC schedule, episode summary.
  Deletion strategy: automatic deletion depending on content age, viewing statistics or amount of content.

In a preferred embodiment, the templates for virtual channels contain default settings for a number of these parameters. This means that the user only needs to fill in the parameters for which a default setting does not exist. Templates have been defined for the following set of virtual channels:
  series
  news
  kids basic
  kids advanced
  genre
  personal
  music
  keyword/topic channel These are the types of virtual channels for which a clear need has been identified and for which it was possible to create a common template. The following sections provide more explanation about a preferred embodiment of each channel type and its template.

A PVR with an electronic program guide (EPG) function has made life much easier for people who like series. However, PVR users still have to deal with several content management tasks. For instance, they need to remember what episodes they have seen, they have to delete already watched episodes, and each time they need to find and select the episode (and position) from where they want to continue watching. In a preferred embodiment of a series channel all these tasks are delegated to the system, apparatus, and method of the present invention and the user only needs to select the preset position (numbered button) to obtain instant access to the right position in the series. To keep it simple, in a preferred embodiment, a user creates a separate channel for each series or serial program he/she likes to follow. Table 1 shows the template settings that have been defined for the series channel, in a preferred embodiment. The non-shaded table entries represent the defaults whereas the shaded table entries need to be entered by the user.

TABLE 1

Template settings for a series channel.

| preferred content | user selects program from a EPG |
|---|---|
| specific requirements | user selects preferred timeslot and channel from EPG |
| virtual channel name | system suggests program title as virtual channel name, user can edit |
| preset position | user defines (system shows channel listing, system can suggest position) |
| resumption strategy | resume where left off (jump back 5 seconds if hours ago) |
| program sequencing | in order of incremental episode number |
| interaction option | basic video navigation (backward/forward, previous/next) |
| deletion strategy | always keep 8 episodes available |

In a preferred embodiment, an advanced menu allows the user to change the defaults. For instance, the following options may be selectable from a menu as alternatives to the default settings:
1. resume behavior
   continue where I stopped
   continue 5 seconds before the point where I stopped (default)
   continue # seconds before the point where I stopped (user enters #)
   continue at beginning of episode
   continue at beginning of next episode
2. program sequence
   follow series order (default)
   follow recording order
   follow user input order (user enters a sequence of numbers separated by spaces, commas, etc., as the order)
3. delete behavior
   delete episode after watching
   delete episode when I watched next one
   always keep 8 episodes available (default)
   always keep # episodes available (user enters #)
   never delete Various issues have been identified and are provided for in a preferred embodiment for the series channel:
1. The 'vacation problem': The user does not watch the channel for 3 weeks. The defined default setting only keeps the last 8 episodes, but some users may want to see all episodes. A special vacation mode allows a user to easily indicate that he/she will be leaving for a vacation, i.e., an extended period of time. Such a vacation mode additionally requires intelligent persistent memory space management.
2. Multi-user issue: If multiple users use one series channel at different times, the added value of a virtual channel becomes limited. Alternative embodiments provided include that the user identifies himself/herself whenever he/she starts watching or that each user creates his/her own channel for the same series. Another possibility is to keep a position history that allows the user to easily jump to a previous 'left position'. An alternative embodiment is able to detect that multiple users are using a particular channel by analyzing the playback and navigation behavior. One indicator is that programs are being watched multiple times (could also mean that the content is just very nice). This knowledge is used in an alternative embodiment by automatically increasing the buffer of stored programs for such a channel, or pro-actively offer positioning support whenever the channel is chosen.
3. Resume where left-off: If a user only watches a virtual channel for a few seconds (e.g. when switching between virtual channels to preview their content), the left-off position of a virtual channel does not change unless the virtual channel is watched longer than a predetermined number of seconds, e.g., 30 seconds, is a new left-off position stored. Besides watching a recorded episode on a virtual channel either partially or completely to establish a left-off position, a user is also able to navigate towards a new left-off position (e.g. fast forward, next) before he/she leaves a virtual channel. Also in this case the position navigated to is saved as the new left-off position for the virtual channel since the navigation task may have been an explicit effort by the user to reposition the virtual channel at that point.
4. Buffer problem: If the system keeps a maximum number of episodes, the user is notified whenever this maximum is about to be reached. If the maximum has been reached and the user re-enters the series channel, a clear notification explains to the user that he/she has missed X episodes.
5. Episode summary: An alternative embodiment offers the user the opportunity to play a summary of the previous episode(s). This is especially helpful if (1) the user did not watch for a long time, (2) if these previous episodes have been deleted, or (3) if the user wants to quickly catch up on a backlog.
6. Create new channel: In a preferred embodiment, the user determines if existing recordings (that have not been watched yet) are to be included in the new virtual channel. The initial resume point for the new channel is selected as one of the group of positions consisting of the position in the recording with the highest episode number and the most recent resume/left-off position.
7. End of virtual channel indication: Whenever the user reaches the 'end of the virtual channel' or in the case of a new virtual channel, a message such as "the next program on this channel will be available at 20:00h" is displayed.
8. Series channel for multiple series: Some users may want to combine multiple series in one virtual channel. For instance, a user may have the daily habit of first watching "Program A" followed by "Program B". A preferred embodiment offers the user the option of creating this type of multiple series virtual channel.

A news channel allows the user instant access to the latest version(s) of his/her favorite news or current affairs programs. The user creates a separate channel for each news program he/she likes to follow. Table 2 contains the settings for the template for a news channel (user has to enter the shaded parts), in a preferred embodiment

TABLE 2

Template settings for a news channel.

| preferred content | user selects news program from EPG |
|---|---|
| specific requirements | user selects preferred timeslot/channel for news program from EPG |
| virtual channel name | system suggests "news channel", user can edit |
| preset position | user defines (system shows channel listing, system can suggest position) |
| resumption strategy | resume where left off if within 2 hours, otherwise, start at the beginning of the most recent news program, if that program has not been watched and the most recent program has been watched, show "end of channel". |
| program sequencing | recording order |
| interaction possibility | basic video navigation (back-/forward, previous/next) |
| deletion strategy | keep last version |

In a preferred embodiment, an advanced menu allows the user to change the defaults. For instance, the following options are selectable from a menu as alternatives to the default settings:

1. resume behavior
   resume where left off if within 2 hours, otherwise, start at the beginning of the most recent news program, if that program has not been watched and if the most recent program has been watched, display the "end of channel" message (default)
   if a new recording has been made since last access to this channel, start at the beginning of this new recording, otherwise, resume where left-off.
2. program sequence
   recording order (default). The basic idea of the news channel is to provide instant access to the latest news. Consequently, the resume position is (after 2 hours) at the beginning of the latest news show, if this one has not been watched yet. Otherwise the resume point is at the end of the latest news show. The program sequence default is "in recording order" to allow users to go to older versions of this news program with the previous button.
3. delete behavior
   delete program after watching
   delete program when I watch the next one
   keep last version of news program (default)
   keep # versions of new program (user enters #)

Several issues were identified for the concept of a virtual news channel:

1. Tuner often busy: If the user does not specify a preferred timeslot for a news program (e.g., Headline News), the system will be actively recording every episode of Headline News multiple times a day (10.00, 16.00, 18.00, 20.00, 22.00 etc). Also in the case of a vacation, the system may easily detect a lack of user interaction, however, on the moment the user restarts interaction, there may be a high desire for a news update which means that unless explicitly indicated by the user the system cannot go to vacation mode. In order to prevent the system from being busy all day long (or recording all news repetitions during the night), in a preferred embodiment the user defines a timeslot in which he/she usually is interested in watching news (e.g. 19.00-24.00). In an alternative embodiment, an analysis of the usage history is performed to automatically determine this timeslot.
2. With or without preferred timeslot: In a preferred embodiment, users have the choice of defining (1) a virtual channel for all (latest) number of shows or (2) a virtual channel for all (latest) shows. Difficulty is if user selects preferred program via the EPG, since an EPG item represents a program title, timeslot and real channel.
3. In-channel navigation: If a user keeps multiple versions of a news program, those can be accessed with a previous button. However, the behavior of previous jumps may not be easy to understand. Proper feedback on in-channel navigation is needed (e.g. "Headline News—Yesterday") in order to avoid users confusing old news with new.
4. Newer version arrives when watching: What if a user changes to a news channel at 19.59 and a newer version arrives at 20.00? In this case the user gets a "trigger for newer content" at the moment that the 20.00 news starts. However, this is only relevant during the first 5 or 10 minutes of the news program, after such a trigger is not presented to the user.
5. More than one news program per channel: If multiple news or current affairs programs are specified for one news channel, the program sequencing and resumption strategy tend to become very complicated and difficult to understand. The idea behind multiple news or current affairs programs is, that it would support typical "rituals" that people may have, like for instance watching first an "anchored evening news program", then "a business report" and after that "a news analysis program". The different frequencies at which these programs may be scheduled combined with their different role in the ritual, makes the program sequencing and resumption difficult.

A preferred embodiment provides a kids' channel that includes one or multiple kids' programs that can be selected by the user to be recorded and played back in the virtual channel. Table 3 describes a preferred embodiment of the template that has been defined for the kids' channel (user has to enter the shaded parts).

TABLE 3

Template settings for a kid's channel

| preferred content 1 | user selects kids' program 1 from EPG |
|---|---|
| specific rqts 1 | user selects preferred timeslot/channel for kids' program 1 from EPG |
| preferred content 2 | user selects kids' program 2 from EPG |
| specific rqts 2 | user selects preferred timeslot/channel for kids' program 2 from EPG |
| preferred content 3 | user selects kids' program 3 from EPG |
| specific rqts 3 | user selects preferred timeslot/channel for kids' program 3 from EPG |
| virtual channel name | system suggests "kids channel", user can edit |
| preset position | user defines (system shows channel listing, suggests position) |
| resumption strategy | resume where left-off if within 1 day, otherwise start at beginning of next program |
| program sequencing | 1. kids' program 1<br>2. kids' program 2<br>3. kids' program 3<br>replay programs that have been marked as 'nice' |
| interaction possibility | basic video navigation (backward/forward, previous/next) possibility to indicate 'nice' or 'delete' |
| deletion strategy | delete if marked as delete or if skipped twice keep 8 hours of TV programs at max |

In a preferred embodiment, an advanced menu allows the user to change the defaults. For instance, the following options may be selectable from a menu as alternatives to the default settings.
1. resume behavior
   continue where I stopped if within 1 day, otherwise start at beginning of next program (default)
   always continue where I stopped
2. program sequence
   program 1—program 2—program 3 (default)
   follow recording order
   follow random order
3. delete behavior
   delete program after watching
   delete if marked as delete or if skipped twice (default)
   delete oldest first In a preferred embodiment of an advanced menu, the user can change the default number of a of recurring programs.

Various issues were identified for the concept of a kid's channel:
1. Repetitions: Young kids like to watch certain TV programs over and over again. The idea is to offer some interactivity to these users, enabling them to mark the programs they would like to see again as 'nice'. As a result, in a preferred embodiment, the system keeps the 'nice' program and repeats it on the channel at a later time.
2. Different age groups: At a certain age, the need for repetitions disappears. In a preferred embodiment, the age of the kids' channel user(s) is inferred by means of the metadata of the programs in the kids' channel. For instance, TV metadata allows for the assignment of subclasses (preschool, 6-14, 10-16) to kids' programs. In a preferred embodiment, the virtual channel behavior (repetitions, resumption, sequencing, etc.) is tuned towards the estimated age group.
3. Deletions: Given the need for repetitions, programs are deleted if the user explicitly indicates this (mark as 'delete') or from implicit feedback (program has been skipped twice).
4. Advanced kids' channel: In a preferred embodiment of an advanced kids' channel, the user is able to indicate the age of the kids and possibly also the desired violence level or educational level of the kids' programs. A preferred embodiment includes the amount of time that kids are allowed the watch the channel per day or week. In this way, a preferred embodiment can create a kids' channel that is targeted towards the age of the kids without necessarily having to select example TV programs, while taking into account the requirements as defined by the parents. In a preferred embodiment, this is a way to filter the kids programs that parents and kids can choose from at the time that they create a kids' channel. It should be noted that offering such an advanced channel depends on the availability of extensive metadata (age group, violence level, educational level). Furthermore, kids are restricted from changing the settings of the channel, in a preferred embodiment, by an access control mechanism that restricts the kids from accessing the settings of the kids' channel.

In a preferred embodiment, a topic/keyword virtual channel is provided for the user to create a virtual channel which is dedicated to a certain topic, keyword or celebrity (e.g. an actor, artist, presenter or director). The successful creation of such a virtual channel is highly dependent on the available metadata that describes each television program.

In a preferred embodiment, a topic virtual channel is defined by specifying a keyword for a specific metadata field (e.g. for program title, actor, director or program description field).

In an alternative embodiment, a topic channel is defined by the selection of a subgenre or subclass. The TV metadata specification allows for the assignment of subclasses to programs. That means that besides a genre, such as music or sports, the subgenre can also be indicated, in a preferred embodiment. For instance, the metadata can be specifically about jazz, ballet, motor sports or athletics. It should be noted, however, that currently this subgenre information is seldom available.

More advanced users are able to define a more complex filter by entering multiple keywords or by combining requirements (e.g. subgenre=science fiction, and director=Steven Spielberg).

Table 4 present the template that has been defined for the Keyword/Topic channel (user has to enter the shaded parts) in a preferred embodiment.

TABLE 4

Template settings for a topic channel.

| preferred content | user enters keyword(s), celebrity name or selects subgenre |
|---|---|
| specific requirements | user selects preferred channels, language(s), genre(s) |
| virtual channel name | system suggests keyword/celebrity/sub genre as name, user can edit |
| preset position | user defines (system shows channel listing, system suggests position) |
| resumption strategy | resume where left-off |
| program sequencing | best matches are played first, if unknown recording order is followed |
| interaction possibility | basic video navigation (backward/forward, previous/next) possibility to indicate 'keep' or 'delete' enable user to see list of recorded and scheduled 'hits' |
| deletion strategy | delete if marked as delete or if skipped twice keep 8 hours of TV programs at max, delete oldest first |

An embodiment of an advanced menu allows the user to change the defaults. For instance, the following options are selectable from a menu as alternatives to the default settings:
1. resume behavior
   continue where I stopped (default)
   start at beginning of next program
2. program sequence
   best matches first
   best matches are played first if there is no ranking on matches, the recording order is followed (default)
   follow random order
3. delete behavior
   delete program after watching
   delete oldest programs first (default)
   delete if marked as delete or if skipped twice
   never delete Issues identified for the topic channel include:
1. Definition broadness: One of the problems of defining a topic virtual channel is that if the channel is defined too broadly, the system will be flooded with content for it, whereas if it is defined too narrowly, the user may frequently end up in a virtual channel that is empty or has a limited amount of content. This means that, in a preferred embodiment of a topic virtual channel, whenever a user is in the process of defining a topic channel, instant feedback is provided on the amount of television programs that fit the query. For instance, the system uses an available EPG's metadata to indicate how many programs falling within the coming time period actually match the user's definition of the topic virtual channel. An overview of the program titles matching the query is also provided for the user to further fine-tune the topic virtual channel definition.

2. Entering keywords: Two ways of entering keywords are supported, in a preferred embodiment. The user can either type the keyword himself (via keyboard or remote control) or he/she can select the keyword from a provided drop-down list of available keywords. The latter helps to overcome mistakes in typing the keyword. To ensure the availability of many keywords, a history of keywords used by the EPG is collected, in a preferred embodiment, over time. In the case of a connected product, an alternative embodiment provides access to online dictionaries and access to celebrity name databases to verify the correct spelling of keywords.

3. Keyword translation: EPG metadata is typically provided in the language of the broadcasting channel. In a preferred embodiment there is an automatic keyword translation mechanism built in (preferably one that translates only to the languages the user understands).

4. Channel naming: if a user has entered multiple keywords/criteria for the channel, besides a suggested channel name, the system allows the user to select one from the keywords/criteria.

5. What is this doing in my channel?: In some cases users may wonder why certain programs end up in the virtual channel. In a preferred embodiment, the user can preview what matches have been made (e.g. system shows matched keywords as highlights in program description).

Other types of virtual channels are also possible using the templates of the present invention and while the foregoing focused on several example virtual channel types, this was for expository purposes only and one skilled in the art will realize that the following types of virtual channels and other types are also possible using the templates of the present invention.

It is possible to create a movie channel consisting of movies which are available. A virtual channel automatically starts playing a movie at the moment that the user enters the channel. Another aspect is that on the moment that a movie has ended a virtual channel would automatically continue with a second movie so a delay option is built in to the movie virtual channel, in a preferred embodiment.

Another type that can be created is a personal channel virtual channel. This can be seen as the ultimate virtual channel which presents the user with the best television programs according to the user's own personal preferences and not a recommender's. This implies that a system not only needs to know what a user's preferred television content is, but also when the user likes to watch what programs and in which order, and in a preferred embodiment it is possible for a user to define a personnel template having these features built-in with appropriate user-specified defaults.

Another type that can be created is a music channel. Broadcast music channels exist (e.g. MTV). A user can set up a virtual channel to select from music channels in the same way the user can use templates to set up other virtual channels.

In general it is important that more advanced users are able to experiment with the virtual channel features provided by a preferred embodiment and create virtual channels that go beyond the typical virtual channels such as defined above. The keyword/topic channel is provided for this.

Virtual radio channels are also covered by the template virtual channel system, apparatus, and method of the present invention. The foregoing discussions are by way of example only and apply equally well to using templates to set up virtual channels for radio programs.

A preferred embodiment applies to any type of content that can be characterized by content metadata and associated with a virtual channel described using a template, wherein the content can be accessed on a systematic basis for inclusion in the defined virtual channel. Because of the flexibility of databases, for example, content selection rules can be easily defined and redefined using stored procedures and in the case of objects, method can be easily defined to implement selection rules. Stored procedures and methods can be made visible to the user in a user-friendly manner for definition and redefinition thereof. A template, according to the present invention has associated stored procedure and methods as well as data and so does an instance of a template. Therefore, the present invention is intended to cover extensible templates having user-definable procedures and methods (rules) and is not limited in any way to the foregoing examples, which are example only. This applies equally to the following discussions, as well.

At various times, a user may want to see a 'playlist' overview of a virtual channel. In a preferred embodiment, whenever a user hits a dedicated menu or info button, the playlist of the channel is presented on top of whatever content is being presented for the virtual channel. The user has a choice to automatically pause the content at this point in time, in a preferred embodiment.

In a preferred embodiment, the playlist of a virtual channel consists of the following elements:
1. previous programs (e.g. watched episode or yesterdays' news, which are still available);
2. current program (the program currently being played or paused);
3. next programs (an ordered list of the following programs in the VC); and
4. future programs (programs scheduled to be recorded based on EPG data).

Figure 3:
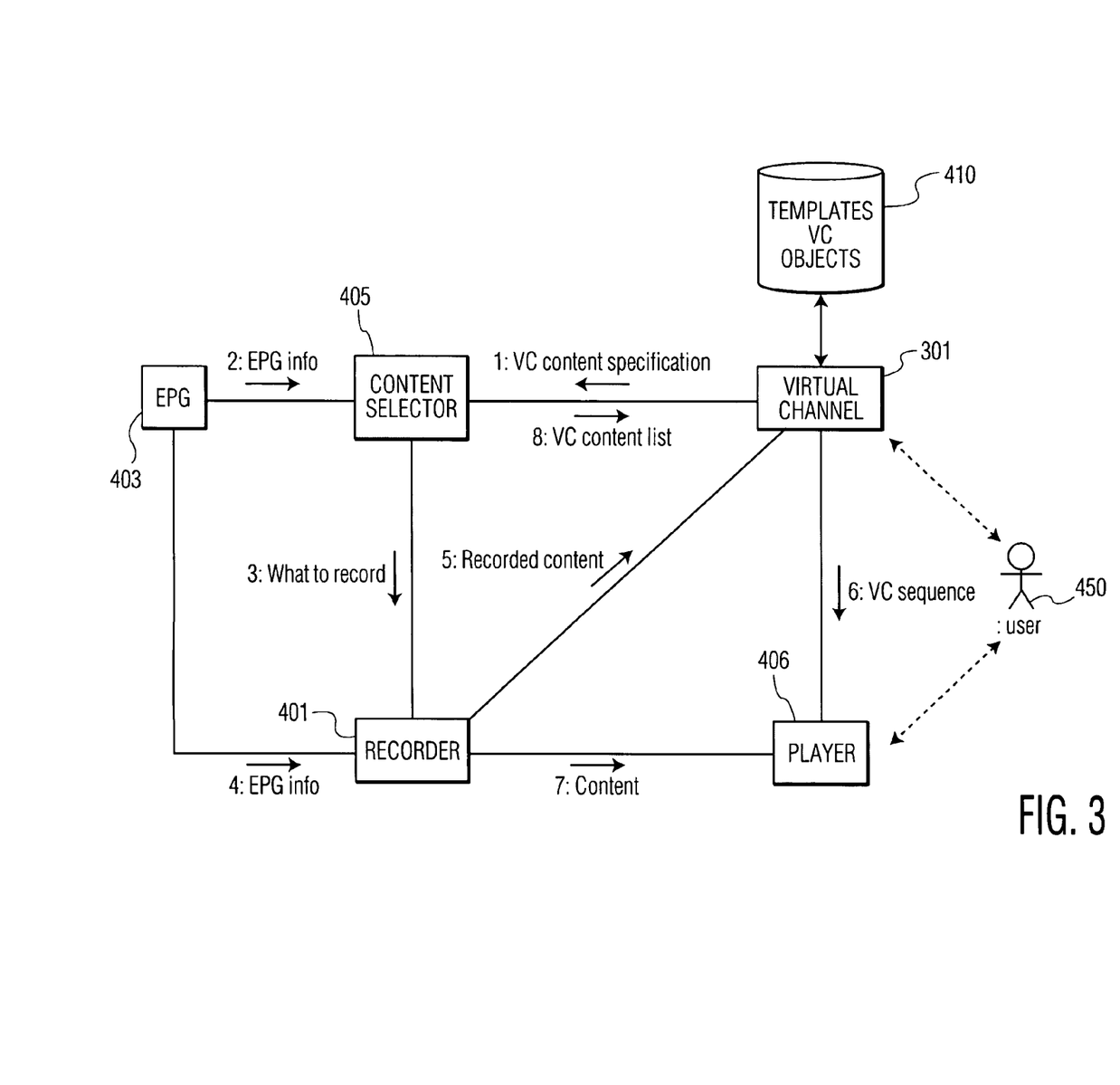
FIG. 3: illustrates a top level overview diagram of a system according to the present invention.
Figure 4:
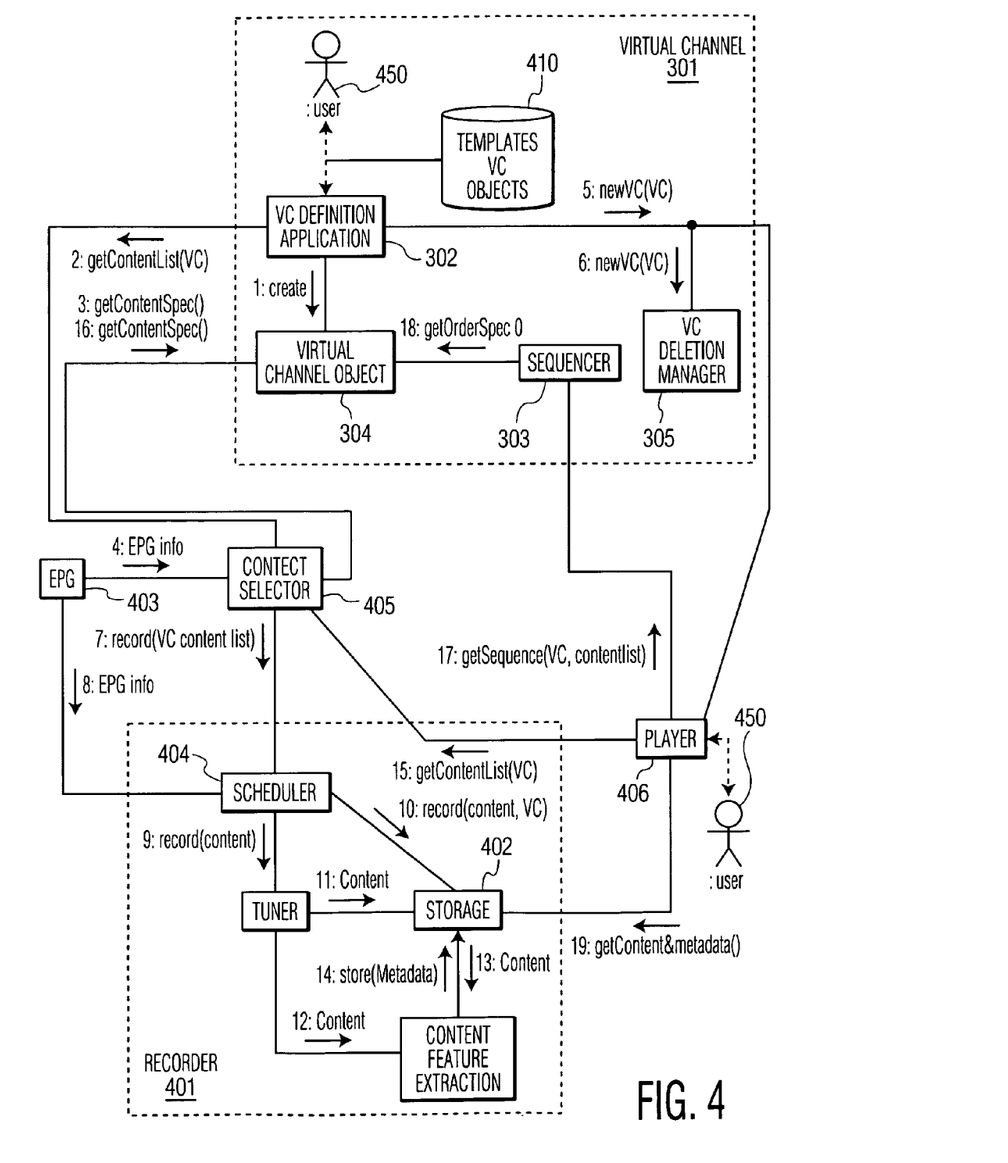
FIG. 4: illustrates a detailed view of the virtual channel system components.

The top level view of a preferred embodiment of a system architecture that supports virtual channels is shown in FIG. 3 and in more detail is shown in FIG. 4. The virtual channel part 301 contains functions of the system that are dedicated to virtual channels, including, e.g., the definition of the virtual channel 302, the sequencing of the content in the virtual channel 303, etc. Furthermore, there are various subsystems that are more or less generic like the EPG 403, the content selector 405 (given the recording requests from the various applications for manual recording, virtual channels, auto-preference recording, . . . ) that determines which programs will be recorded, the recorder subsystem 401 and the player 406.

The top level view of an embodiment of a system that supports virtual channels is shown in FIG. 4. The virtual channel 301 part contains functions of the system that are dedicated to virtual channels, including, e.g., the definition of the virtual channel 302, the sequencing of the content in the virtual channel 303, and in the embodiment illustrated these are captured in a virtual channel object 304.

Figure 5:
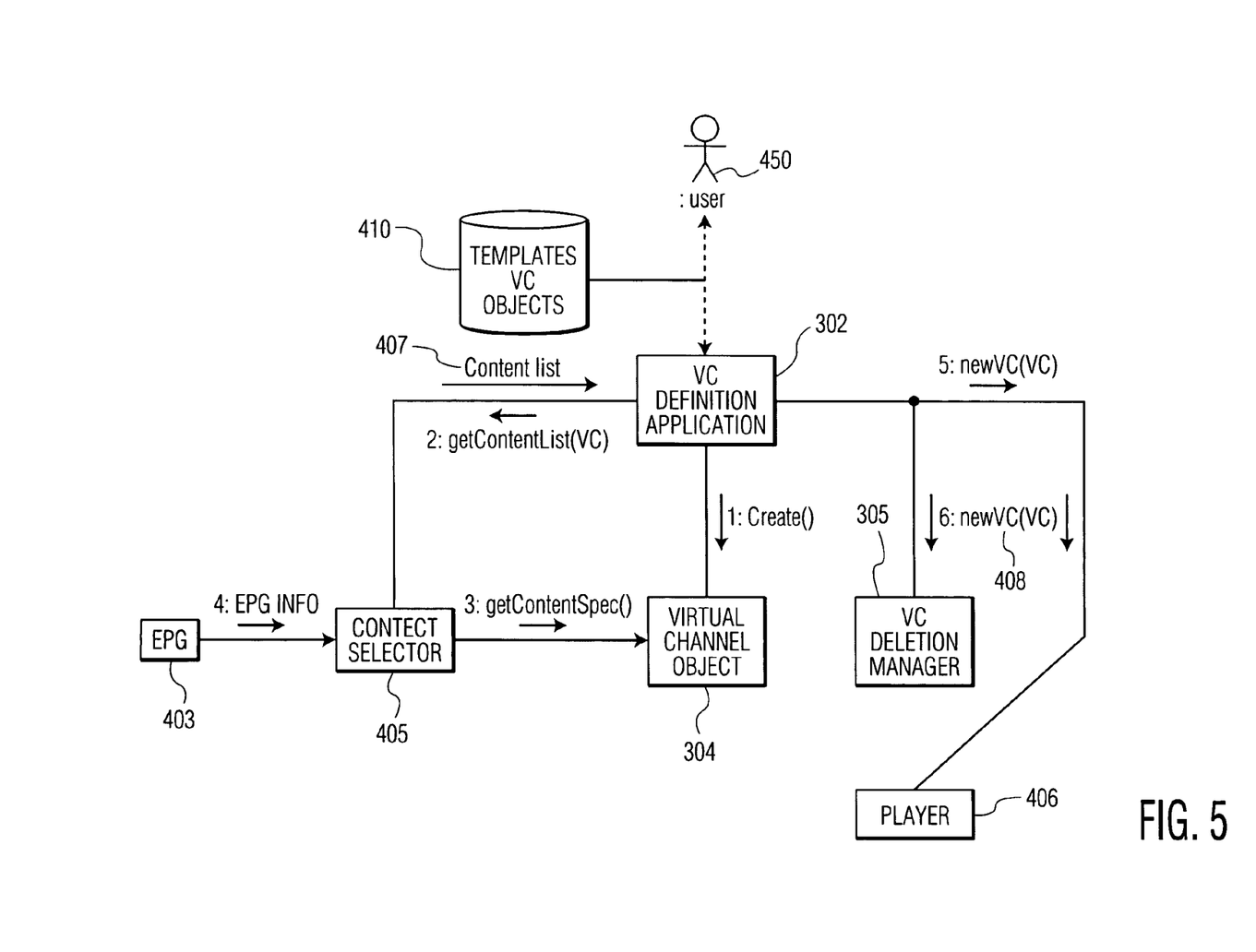
FIG. 5: illustrates virtual channel creation.

FIG. 5 depicts an embodiment of a system that supports virtual channels. How the different subsystems interact in supporting virtual channels, is explained in more detail in the following subsections. With respect to both FIG. 3 and FIG. 4 it should be noted that the content selector 405 is basically a content wish list generator, which can range from very simple (e.g. keyword based filter) to very complex (learning personal profile based recommender).

A preferred embodiment of an apparatus 500 to create a virtual channel is depicted in FIG. 5:

1. Using the templates of the present invention, a preferred embodiment of a virtual channel definition application 302 creates a new virtual channel instance by interacting with the user 450 to fill in virtual channel definition templates 410 and inserts the different virtual channel settings obtained from the filled-in templates 410 (a specification of which content is part of this virtual channel, a specification of the sequencing, . . . ) into a virtual channel object 304 (which is itself a template for creating object instances of a virtual channel class hierarchy).
2. To give feedback to the user while defining the virtual channel, the virtual channel definition application 302 requests a list of content items that match the current virtual channel from the content selector 405.
3. The content selector 405 fetches the content specification from the virtual channel object 304, compares this to the EPG information 403 and returns the matching content list 407.
4. After potential refinements, the virtual channel definition is finalized and the player 406 and the deletion manager 305 are notified of the new virtual channel 408.

Figure 6:
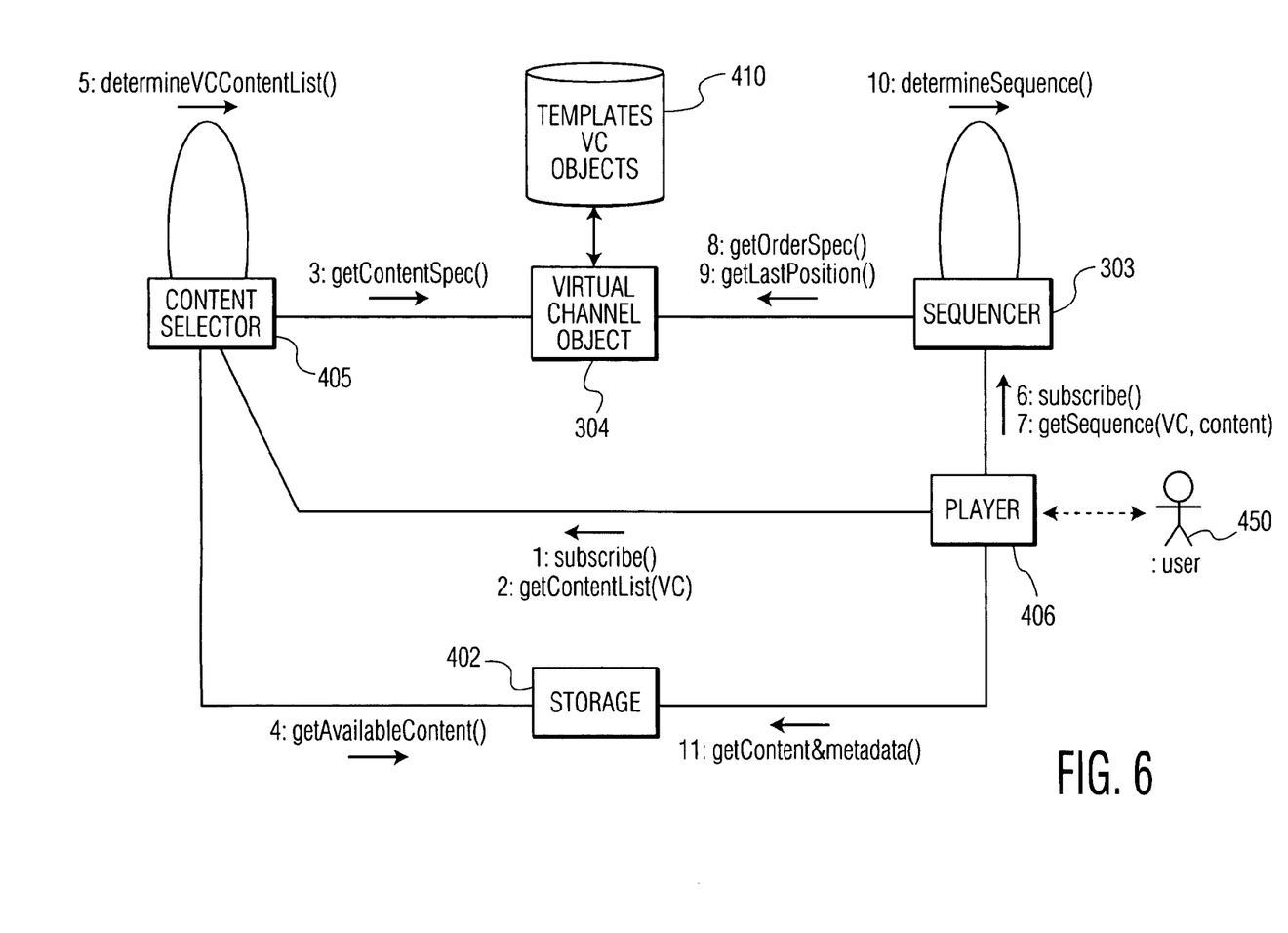
FIG. 6: illustrates virtual channel playback.

Playback of a virtual channel is depicted in FIG. 6. It should be noted that FIG. 6 describes the situation where the virtual channel content list and sequence is determined when the user enters the virtual channel. If determining the content list is too time consuming, this will have to be done when new recorded content becomes available. In that case, the content list will be persistently stored (e.g. in the virtual channel object).

1. To be notified of future changes in this content list (either because new content has been recorded or because the definition of the virtual channel has changed), the player subscribes for changes in the content list at the content selector.
2. Upon activation of a virtual channel, the player 406 requests the content list for this virtual channel from the content selector 405.
3. The content selector 405 retrieves the content specification of this virtual channel.
4. The content selector 405 retrieves a list of available content items from the 402 subsystem.
5. The content selector 405 determines the content list for this virtual channel, which is returned to the player 406.
6. The player 406 subscribes for changes in the sequence (either because new content has been recorded or because the definition of the virtual channel has changed) at the sequencer 303.
7. The player 406 requests the content sequence for the virtual channel from the sequencer 303.
8. The sequencer 303 retrieves the sequence specification from the virtual channel,
9. the last position in the virtual channel.
10. The sequencer 303 calculates the sequence and new position in the virtual channel, which is returned to the player 406.
11. The player 406 retrieves the metadata and the content of the content item from storage 402 to be played now in this virtual channel.

Figure 7:
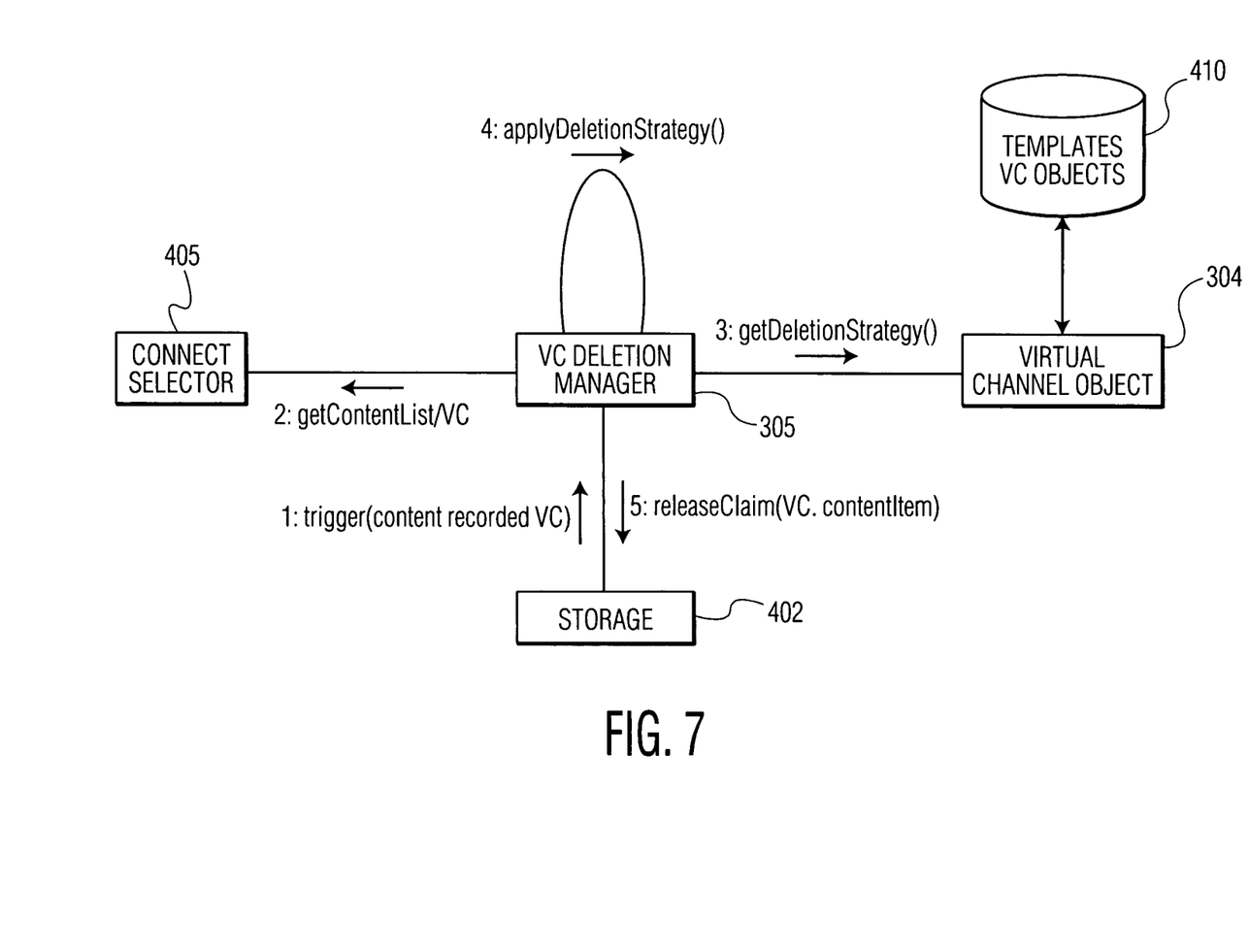
FIG. 7: illustrates deletion of virtual channel content.

Deletion of content that is part of a virtual channel is depicted in FIG. 7.

1. When new content has been recorded in the storage 402, the virtual channel (VC) deletion manager 305 is triggered.

The VC deletion manager 305 is also triggered by other triggers, such as when the virtual channel definition has changed or when a certain period of time has elapsed. These triggers are however not shown in FIG. 7. The trigger also contains the virtual channels (identifiers) for which this content item has been recorded. This also implies that this information should be provided when the content is recorded in the storage 401.

2. The content list 407 for the respective virtual channel(s) is retrieved from the content selector 405.
3. The deletion strategy is retrieved from the respective virtual channel(s).
4. The content that can be deleted, according to the deletion strategy, is determined.
5. The dependencies on these content items are released from the storage subsystem 402. When there are no dependencies left on a specific content item, the content item is deleted from the storage subsystem 402.

While the preferred embodiments of the present invention have been illustrated and described, it will be understood by those skilled in the art that the system, apparatus and methods as described herein are illustrative and various changes and modifications may be made and equivalents may be substituted for elements thereof without departing from the true scope of the present invention. In addition, many modifications may be made to adapt the teachings of the present invention to a particular situation without departing from its central scope. Therefore, it is intended that the present invention not be limited to the particular embodiments disclosed as the best mode contemplated for carrying out the present invention, but that the present invention include all embodiments falling within the scope of the claim appended hereto as well as all implementation techniques and not just the object oriented approach to implementation used as an example.

The invention claimed is:

1. A method for specifying a virtual channel (VC) by use of a VC template, comprising the steps of:
    defining a virtual channel by providing at least one template having a VC type and at least one settable parameter, the at least one settable parameter being selected from the group consisting of resumption strategy, and deletion strategy;
    associating an action with each of the at least one settable parameter, the action being selected from the group consisting of set with provided default value, set with provided default value and allow edit thereof, set with a previous setting and allow edit thereof, and set with prompted-for value;
    associating a behavior of a user with an implicit selection of the VC template;
    displaying a VC template based on a VC template selection based upon an explicit selection of the VC template or an implicit selection of the VC template by the associated behavior of a user; and
    specifying a VC by performing the associated parameter setting action for the displayed virtual channel template.

2. The method of claim 1, further comprising the steps of;
    providing, by an Electronic Program Guide (EPG), a list of content items that match the specified VC; and
    giving feedback of the list of content items.

3. The method of claim 1, further comprising the step of after a pre-specified time has elapsed since activation of a device modified to perform the method of claim 1, the device performing the steps of:
    performing the selection action associated with each at least one template to display a VC template selected thereby; and specifying a VC as settings obtained for each displayed VC template by performing the action associated with the at least one settable parameter thereof.

4. The method of claim 1, further comprising the steps of a wizard systematically executing the actions associated with the template and the at least one settable parameter thereof.

5. The method of claim 1, further comprising the steps of:
displaying a list of previously defined VCs for selection therefrom;
displaying a previously defined VC selected from the displayed list as a filled-in template; and
selectively performing the associated action of the at least one settable parameter at direction of a user.

6. The method of claim 5, further comprising the steps of a wizard systematically executing the actions associated with the template and the at least one settable parameter thereof.

7. The method of claim 6, further comprising the step of in accordance with the VC type of the VC template, ordering the actions associated with the at least one settable action prior to the step of systematically executing said actions.

8. The method of claim 7, wherein the at least one settable parameter is selected from the group consisting of preferred content, specific requirements, virtual channel name, preset position, resumption strategy, program sequencing, interaction possibility, and deletion strategy.

9. The method of claim 8, wherein:
the VC type comprises a type selected from the group consisting of series, news, kids basic, kids advanced, genre, personal, music and keyword/topic; and
further comprising the step of for explicit selection, providing a list of VC types for selection therefrom of a type of VC template to be displayed and filled-in.

10. The method of claim 9, wherein the prompted-for value comprises a list of values for selection therefrom.

11. The method of claim 10, wherein the list of values includes a suggested selection therein.

12. An apparatus for specification of a virtual channel (VC) by a VC template, comprising:
a database including at least one template to define a VC, the at least one template having a VC type, and at least one settable parameter, the at least one settable parameter being selected from the group consisting of resumption strategy, and deletion strategy, and a VC template selection action that is used to implicitly select the at least one VC template based on behavior of a user; and
a VC definition application to
retrieve a VC template from the database and display the retrieved VC template, based on a VC template selection action selected from the group consisting of explicit selection of the VC template and implicit selection of the VC template associated with a behavior of the user,
define a VC as a set of settings obtained for the displayed VC template by performing a pre-defined action associated with each of the at least one settable parameter thereof, and
store the defined VC in the database.

13. The apparatus of claim 12, wherein the VC definition application is further configured to:
access an Electronic Program Guide (EPG) and obtain a list of content items that match the defined VC; and
give feedback of the list of content items.

14. The apparatus of claim 13, wherein the pre-defined action associated with each at least one settable parameter is selected from the group consisting of set with provided default value, set with provided default value and allow edit thereof, set with a previous setting and allow edit thereof, and set with prompted-for value.

15. The apparatus of claim 14, wherein the VC definition application is further configured such that after a pre-specified time has elapsed since a start time, the application executes:
the VC template selection action associated with each at least one template to display a VC template selected thereby; and
each action associated with the at least one settable parameter of the VC template such that a VC is specified as settings obtained for the displayed VC template thereby.

16. The apparatus of claim 15, wherein the VC definition application is further configured as a wizard that systematically executes the actions associated with the template and the at least one settable parameter thereof.

17. The apparatus of claim 16, wherein the VC definition application is further configured to:
display a list of previously defined VCs for selection therefrom;
display a previously defined VC selected from the displayed list as a filled-in template; and
selectively perform the associated action of the at least one settable parameter at the direction of a user.

18. The apparatus of claim 17, wherein the VC definition module is further configured such that in accordance with the VC type of the VC template, the actions associated with the at least one settable action are ordered in a pre-determined way prior to the systematically execution of said actions.

19. The apparatus of claim 18, wherein the at least one settable parameter is selected from the group consisting of preferred content, specific requirements, virtual channel name, preset position, resumption strategy, program sequencing, interaction possibility, and deletion strategy.

20. The apparatus of claim 19, wherein:
the VC type comprises a type selected from the group consisting of series, news, kids basic, kids advanced, genre, personal, music and keyword/topic; and
the VC definition module is further configured such that explicit selection, a list is displayed of VC types for selection therefrom of a type of VC template to be displayed filled-in.

21. The apparatus of claim 20, wherein the prompted-for value comprises a list of values for selection therefrom.

22. The apparatus of claim 21, wherein the list of values includes a suggested selection therein.

23. A system to create and populate a virtual channel with a VC template, comprising:
a database including at least one VC definition of a VC template; stored therein;
a VC definition apparatus configured according to claim 12 to define VC using a template from the database; and
in accordance with the VC, a VC content selector module to periodically access an electronic program guide (EPG) to obtain content selections and to direct a recorder module to populate the VC with recorded content selections.

* * * * *